(12) United States Patent
Williams et al.

(10) Patent No.: US 11,025,297 B2
(45) Date of Patent: Jun. 1, 2021

(54) FULL-DUPLEX CANCELLATION

(71) Applicant: Cable Television Laboratories, Inc., Louisville, CO (US)

(72) Inventors: Thomas Holtzman Williams, Longmont, CO (US); Belal Hamzeh, Westminster, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 171 days.

(21) Appl. No.: 15/802,060

(22) Filed: Nov. 2, 2017

(65) Prior Publication Data
US 2018/0159588 A1 Jun. 7, 2018

Related U.S. Application Data

(60) Provisional application No. 62/416,456, filed on Nov. 2, 2016, provisional application No. 62/579,626, filed on Oct. 31, 2017.

(51) Int. Cl.
| | |
|---|---|
| *H04B 3/23* | (2006.01) |
| *H04N 7/173* | (2011.01) |
| *H04B 10/25* | (2013.01) |
| *G06F 1/02* | (2006.01) |
| *H04B 3/493* | (2015.01) |
| *H04L 5/14* | (2006.01) |
| *H04N 21/61* | (2011.01) |

(52) U.S. Cl.
CPC ............. *H04B 3/235* (2013.01); *H04B 3/238* (2013.01); *H04B 10/25891* (2020.05); *H04N 7/17309* (2013.01); *G06F 1/022* (2013.01); *H04B 3/493* (2015.01); *H04L 5/14* (2013.01); *H04N 21/6118* (2013.01); *H04N 21/6168* (2013.01)

(58) Field of Classification Search
CPC .... H04B 3/235; H04B 3/238; H04B 10/2504; H04B 3/493; H04N 7/17309; H04N 21/6118; H04N 21/6168; H04L 5/14; G06F 1/022
See application file for complete search history.

(56) References Cited

U.S. PATENT DOCUMENTS

| | | | | |
|---|---|---|---|---|
| 5,815,794 | A | 9/1998 | Williams | |
| 6,826,279 | B1 * | 11/2004 | Alavi | H04M 9/082 379/406.01 |
| 7,280,592 | B1 * | 10/2007 | Humblet | H04B 14/023 375/222 |
| 2012/0195351 | A1 * | 8/2012 | Banwell | H04B 1/525 375/219 |
| 2016/0036449 | A1 | 2/2016 | Gu | |
| 2016/0036582 | A1 * | 2/2016 | Jana | H04L 5/143 370/278 |
| 2017/0237491 | A1 | 8/2017 | Mutalik et al. | |
| 2018/0076910 | A1 * | 3/2018 | Zhang | H04B 17/24 |

\* cited by examiner

*Primary Examiner* — Kiet Tang
(74) *Attorney, Agent, or Firm* — Great Lakes Intellectual Property, PLLC

(57) ABSTRACT

Facilitating echo cancellation within communication networks is contemplated, such as but not necessarily limited to facilitating echo cancellation within full-duplex (FDX) communication networks. The echo cancellation may optionally be performed with an echo canceller included as part of or otherwise associated with an FDX node used to facilitate interfacing signaling between a digital domain and an analog domain of a FDX or other communication network.

18 Claims, 4 Drawing Sheets

FULL-DUPLEX CANCELLATION

CROSS-REFERENCE TO RELATED APPLICATIONS

This application claims the benefit of U.S. provisional application No. 62/416,456 filed Nov. 2, 2016 and the benefit of U.S. provisional application No. 62/579,626 filed Oct. 31, 2017, the disclosures of which are hereby incorporated in their entireties by reference herein.

TECHNICAL FIELD

The present invention relates to facilitating echo cancellation within communication networks, such as but not necessarily limited to facilitating echo cancellation within full-duplex (FDX) communication networks.

BACKGROUND

An echo may be considered as a type of linear distortion, disruption, etc. caused by a reflection of a transmitted signal impairing a receiver or other device, sensor, etc. attempting to either process the signal and/or to process another signal being transmitted within an area and/or a communication medium affected by the reflection. One non-limiting aspect of the present invention contemplates facilitating echo cancellation for purposes of ameliorating the effects of extraneous or unintended signals within a communication network, including ameliorating reflections and/or other signal unintentionally or undesirably generated in response to transmission of another signal.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
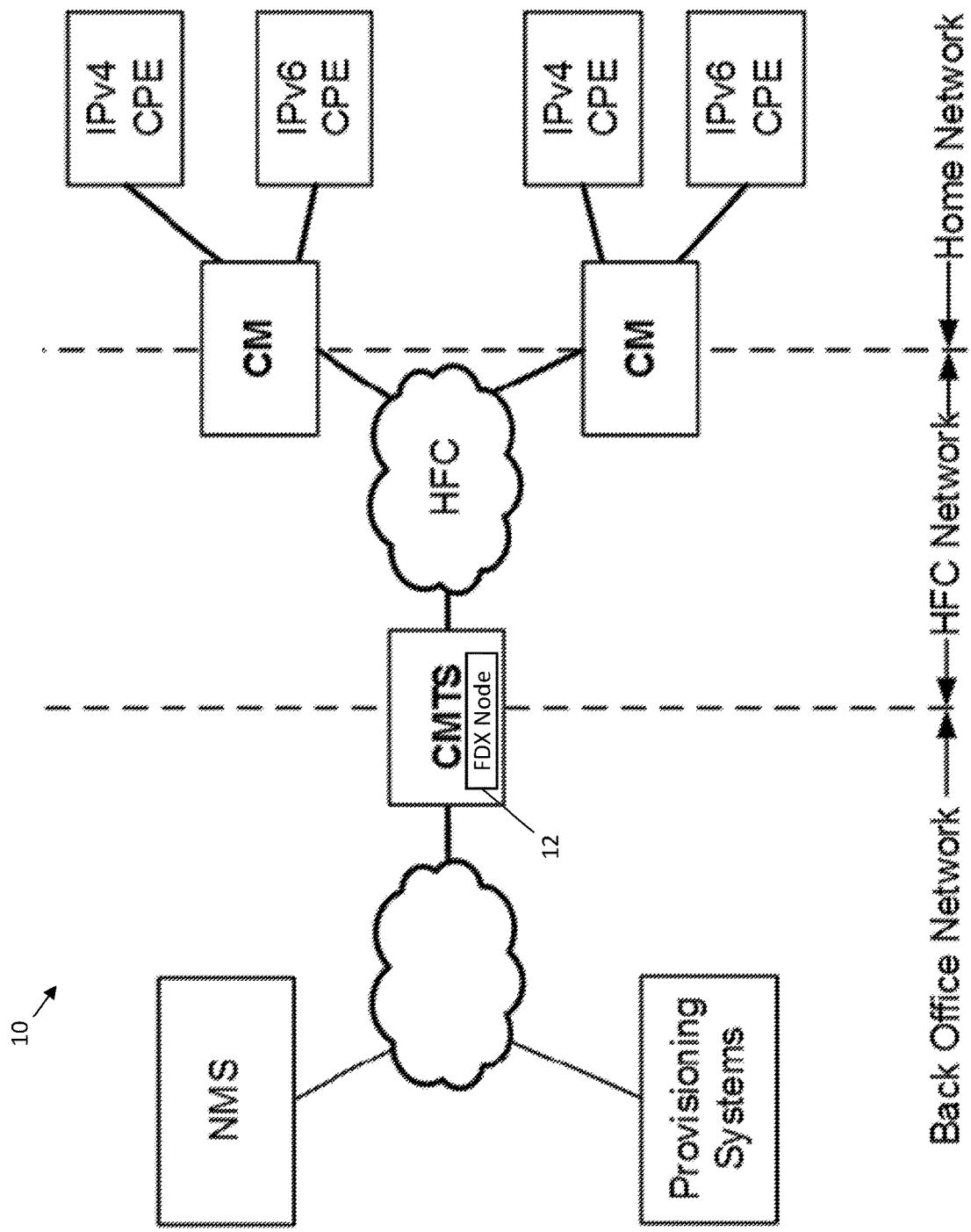
FIG. 1 illustrates a communication network in accordance with one non-limiting aspect of the present invention.

FIG. 1 illustrates a communication network 10 in accordance with one non-limiting aspect of the present invention. The communication network 10 may correspond with any network having capabilities sufficient to facilitate wired and/or wireless communications between one or more endpoints, and is predominant described for exemplary, non-limiting purposes with respect to being configured to facilitate services described in Cable Television Laboratories, Inc. publication entitled *Data-Over-Cable Service Interface Specifications, DOCSIS 3.1, Physical Layer Specification, CM-SP-PHYv3.1-I12-171026*, the disclosure of which is hereby incorporated by reference in its entirety herein and which is represented within the above-identified U.S. provisional application No. 62/579,626. The communication network may optionally correspond with that described in U.S. Pat. No. 9,762,377, entitled Hybrid Full Duplex Communication In A Radio Frequency Cable Network, the disclosure of which is hereby incorporated by reference in its entirety herein, and/or otherwise correspond with another suitable network configured to facilitate virtually any type of signal consistent with the operations described herein. One non-limiting aspect of the present invention contemplates facilitating echo cancellation within the communication network using a full-duplex (FDX) node 12 utilized to facilitate interfacing signaling between a digital domain and a non-digital domain of the network 10. (The non-digital domain may be interchangeably referred to as an analog domain and/or a radio frequency (RF) domain.) The FDX node 12 is shown to be included as part of or otherwise associated with a cable modem termination system (CMTS) for exemplary purposes as the contemplated FDX 12 node may operate independently of the CMTS and/or in cooperation with any other network element or construct (not shown) designed to facilitate interfacing signaling between digital and analog domains, e.g., a remote PHY or RPHY that may implement some or all of the functions of a CMTS, including MAC and PHY layers.

Figure 2:
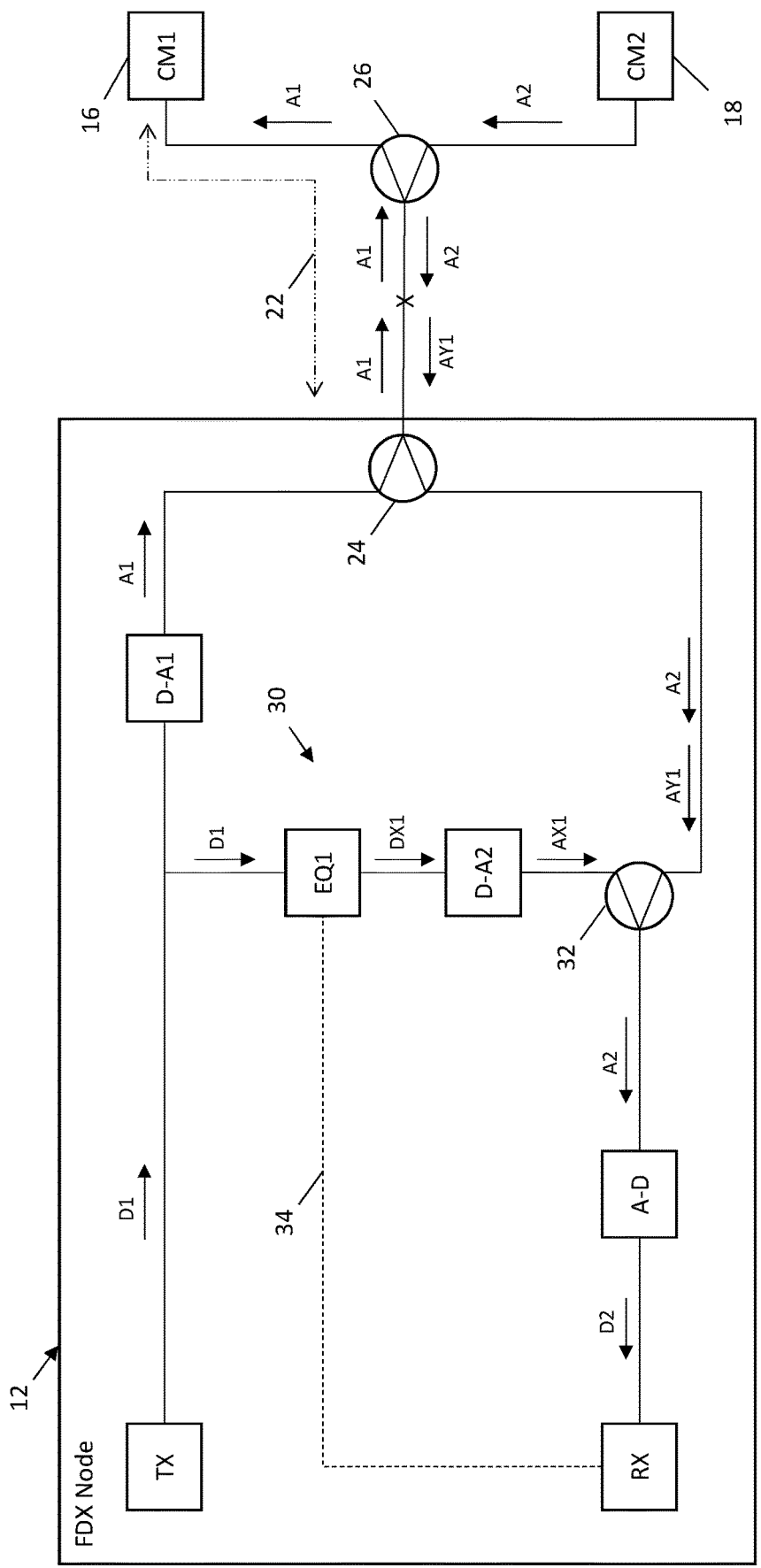
FIG. 2 illustrates a networking arrangement in accordance with one non-limiting aspect of the present invention.

FIG. 2 illustrates a networking arrangement in accordance with one non-limiting aspect of the present invention where the FDX node 12 facilitates FDX-based communications with one or more FDX devices, which are shown for exemplary purposes to be cable modems (CMs) 16, 18. The FDX node 12 may be configured to facilitate interfacing signaling between the digital domain and the analog domain associated with the communication/FDX network 10. The FDX node 12 may include a digital network or section for processing signaling within the digital domain and an analog network or section for processing signaling within the analog domain. The segments of the FDX node 12 considered to be occupying or part of the digital domain and the analog domain may be ascertained according to the functions performed by the corresponding FDX components, i.e., based on whether the corresponding components facilitate functions associated with manipulating digital signals or analog signals. One non-limiting aspect of the present invention contemplates demarcating the digital domain and the analog domain, or more particularly the digital network and the analog network within the FDX node 12, according to locations where signaling is converted from digital to analog or vice versa from analog to digital. Locations upstream from digital-to-analog (D-A) conversion locations may be considered as part of the digital domain with the locations downstream therefrom being considered as part of the analog domain. Locations downstream from analog-to-digital (A-D) may be considered as part of the digital domain with the locations upstream thereof being considered as part of the analog domain.

The FDX node 12 may include a transmitter TX for generating, relaying, processing and/or otherwise facilitating transmission of a first digital signal D1 intended to be delivered in the analog domain to a recipient, which is described for exemplary purposes to correspond with signaling/information provided from the CMTS but could similarly be provided/instigated from non-CMTS, network elements. The first digital signal D1 may be intended for the first CM 16 connected to a home network or otherwise positioned proximate an ending of a signaling path 22. One non-limiting aspect of the present invention contemplates the signaling path 22 being formed in cooperation with a coaxial cable or other bounded communication medium, however, the present invention fully contemplates its use and application in facilitating communications in the analog domain through wireless or other unbounded communication mediums. The signaling path 22 is shown without including amplifiers, gains or other components or circuits configured to facilitate amplifying or otherwise increasing strength, power, etc. for signaling being transported therethrough. The FDX node 12 in this manner may be considered to facilitate a deep fiber architecture by providing a location for optical-to-electrical conversions closer to a household or the home network/location of the recipient/CM to minimize links of non-optical communication and to provide a node+zero amplifier (N+0) architecture where there are no amplifiers between the FDX node 12 and the household. The N+0 architecture can present communication challenges, particularly with respect to facilitating FDX channels within the 108 MHz-684 MHz frequency range contemplated in DOCSIS 3.1 and/or in other environments where relatively high frequencies are employed.

One of the challenges affecting cable networks and other communication systems employing a tree-and-branch architecture or similarly susceptible arrangement can result from noise funneling where noise from endpoints, splitters, connectors, etc., combine to affect communications. Another problem is with echoes resulting from reflection and/or simultaneous upstream and downstream communications, being combined at one or more locations in a manner sufficient to interfere with other communications/transmissions associated therewith. In the exemplarily illustrated FDX environment, e.g., one having a fiber node plus zero amplifiers, the challenges can be exacerbated due to the noise problem potentially being full-band, i.e., not just at the sub-split frequencies, as the full-band noise can, for example, let FM radio transmissions or UHF TV broadcast signals travel upstream. The relatively high frequencies contemplated for use across the relatively wide FDX spectrum can also present additional communication challenges beyond those attendant to the absence of amplifiers due to some of the relied upon communication components lacking a sufficient dynamic range and/or poorly performing at certain dynamic ranges within which operations may be required in order to facilitate signaling across an entirety of the FDX spectrum. One non-limiting aspect of the present invention particularly contemplates addressing dynamic range issues associated with facilitating conversion of signaling between the digital domain and the analog domain by leveraging D-A conversions generally having a 6 or 12 dB advantage, e.g., one or two bits, over A-D conversions.

The FDX node 12 may include D-A converter D-A1 to facilitate converting the first digital signal D1 to a first analog signal A1 sufficient for downstream communication over the analog communication medium to the first CM 16, i.e. the first digital signal D1 having an RF (analog) waveform. The FDX node 12 may include a first splitter, relay, coupler, directional element, interface, input/output (I/O) or other element 24 to facilitate interfacing the first analog signal A1 with the analog communication medium, optionally operating in cooperation with an amplifier located upstream to drive the line. The analog communication medium may include a second, similar splitter 26 to facilitate establishing a tree-to-branch architecture between the first CM 16 and the second CM 18 and/or additional CMs, which may optionally be connected through additional splitter/branches, such that the first analog signal A1 may optionally also be received at the second CM 18. The second CM 18 is shown for exemplary purposes as communicating a second analog signal A2 upstream to the FDX node to illustrate other signaling that may be cooperatively traveling within the analog communication medium. The first and second analog signals A1, A2 may optionally be simultaneously transmitted in the upstream and downstream directions over the analog communication medium, such as with frequency division duplexing (FDD) and/or other suitable signaling with manipulations e.g., using the full duplexing methodology described in DOCSIS 3.1. The first CM 16 may optionally transmit an analog signal (not shown) upstream to the FDX node 16 simultaneously with the first analog signal A1 and in cooperation with the second analog signa A2, such as with time division duplexing (TDD) and/or other suitable signaling with manipulations e.g., using the full duplexing methodology described in DOCSIS 3.1. Other duplexing and communication strategies may be utilized to facilitate duplexing and/or other signaling scheduling strategies without deviating from scope and contemplation of the present invention The second analog signal A2 is shown to be accompanied by a reflection AY1 generated within the analog communication medium in response to passage of the first analog signal A1 therethrough. A source, location, etc. associated with the reflection is diagrammatically illustrated as X for exemplary purposes as occurring downstream from the first splitter 24 and upstream from the second splitter 26, however, the origination of the reflection AY1 may occur at another location and/or at multiple locations within the analog to location medium, e.g., the reflection AY1 may be induced at multiple locations within the analog communication medium and optionally be composited with more than the second analog signal A2, i.e., multiple cancellations of the reflection AY1 may be desired. The illustrated reflection AY1 is presented to characterize an infrastructure of the analog communication medium producing the reflection AY1 or other signaling influence capable of inducing undesirable echo within the analog domain, which may be typical of one or more interference-inducing signals resulting from transmission of the first analog signal A1 from the FDX node 12. One non-limiting aspect of the present invention contemplates the FDX node 12 including an echo canceller 30 to facilitate canceling a portion or an entirety of the reflection AY1 and/or multiple occurrences of the reflection AY1 prior to reaching a receiver RX, i.e., prior to the reflection traveling further upstream than the FDX node 12 to a CMTS or other upstream connected device. The echo canceller 30 may optionally perform signal cancellation within the analog domain and cooperate with other signal cancellation capabilities, such as the CM-based cancellation capabilities described in DOCSIS 3.1.

The echo canceller 30 may include an equalizer EQ1 for filtering ran echo expected or anticipated to occur in response to a transmission of the first analog signal A1 from the FDX node 12, i.e., a representation of the reflection AY1 prior to actual occurrence of the reflection AY1 in response to transmission of the first analog signal A1. The equalizer EQ1 may include or be associated with a controller (not shown) having a non-transitory computer-readable medium with a plurality of non-transitory instructions executable with a processor of the FDX node 12 or otherwise associated therewith to facilitate estimating the echo and/or performing or responding to the other operations and processes contemplated herein to facilitate the echo cancellation. The equalizer EQ1 may execute a training process whereby pilots, test signals, probes, or other sounding signals may be generated with the transmitter TX or otherwise communicated from the D-A converter D-A1 for transmission over the analog communication medium to facilitate assessing network performance, characteristics, metrics, waveforms and other information suitable to facilitate anticipating echoes resulting from the FDX node 12 facilitating transmission of the analog signal A1 and/or additional analog signals. The training process may include the equalizer EQ1 coordinating the sounding signals with MAP instructions or other command/control instructions capable of being transmitted to the CMs 16, 18 to facilitate identifying channel responses resource block assignments (RBAs), FDX channels, signal levels, attenuation, etc. The sounding/training process may be done by individually and/or collectively by controlling corresponding CMs 16, 18 to turn on/off, listen for signals, provide metrics and otherwise generate information to assess isolation and echo/reflection characteristics for signals communicated from the FDX node 12.

The equalizer EQ1 may utilize the information collected through the training process to facilitate determining the magnitude and phase of reflections and to determine appropriate cancellation signals needed to partially or entirely eliminate, or cancel, the reflections. The training process may include assessing signaling resulting from virtually any type, pattern, waveform or shape of signal being communicated from the FDX node 12 or generated with the transmitter TX. The equalizer EQ1 may perform a comparison process where individual signals are sampled in the digital domain after transmission from the transmitter TX and compared to the information gleaned from the training process to generate a digital cancellation signal DX1 sufficient for canceling the echo, i.e., determining a digital cancellation signal DX1 particularly focused to addressing echoes on a per-transmission basis for signaling being output from the transmitter TX. The corresponding digital cancellation signal DX1 may be provided to a D-A converter D-A2 of the echo canceller 30 to facilitate generating an analog cancellation signal AX1 sufficient for use with the analog domain to cancel the reflection AY1. The analog cancellation signal AX1 may be generated to have a magnitude and phase and/or delay suitable for opposing corresponding phase and/or delay in the reflection AY1 so as to enable the contemplated cancellation. The echo canceller 30 may include a combiner or directional coupler 32 to facilitate combining the analog cancellation signal AX1 with signaling traveling upstream through the FDX node 12, i.e., to perform the actual cancellation in the analog domain. The combiner 32 may add the analog cancellation signal AX1 to the reflection AY1 and/or the second analog signal A2 such that an analog signal output A2 from the combiner 32 has the reflection AY1 at least partially canceled therefrom, leaving a clean A2. The echo canceller 30 may include an A-D converter A-D to convert the analog signal output A2 from the combiner 32 to a second digital signal D2 suitable for use at the receiver RX, i.e., to facilitate transporting a digital form of the second analog signal A2 to the receiver RX, which ideally entirely omits the reflection AY1.

The training process may be done using pilot signals on OFDM transmissions, where the equalizer EQ may process a pilot received in response to a transmitted pilot to determine occurrence of a corresponding test reflection. The test reflection may be analyzed with the equalizer EQ to determine the magnitude, phase and/or delay attendant thereto, such as by representing the reflection and/or the magnitude of phase and/or delay as a complex function as a function of frequency. The pilot signals may be transmitted as part of the training process to create a reflection library or other database sufficient to represent reflections having occurred within the system over time according to differing characteristics for the pilot signal and/or the analog communication medium, e.g., temperature, traffic, wind, distance, power levels any number of other variables may cause or induce the analog communication medium to generate reflections of different types and characteristics in response to essentially the same pilot signal. The equalizer EQ may perform the training process on and on-going or interim basis to facilitate estimating and/or adjusting the estimating process for reflections expected to occur for non-pilot signals, e.g., the first analog signal A1.

The echo canceller 30 contemplated herein may be configured and controlled in the above-described manner to facilitate signal, echo, noise, etc. cancellation within the analog domain, or at least within the analog network of the FDX node 12. The analog-based cancellation strategy is believed to be beneficial, particularly within FDX systems of the type described in DOCSIS 3.1, due to its ability to cancel signals across a wide dynamic range necessary to facilitate the operations associated therewith. The second D-A converter D-A2 utilized to facilitate converting the digital cancellation signal DX1 to the analog cancellation signal AX1 may be of the type having a 6 or 12 dB advantage, e.g., one or two bits, over a (typical) 65 dB dynamic range of the A-D converter A-D, thereby enabling the present invention to utilize the advantageous dynamic range of the second D-A converter D-A2 to facilitate signal cancellation across a broader spectrum than would be capable with the conversion/cancellation occurring after the A-D converter A-D. The echo canceller 30 may include a calibration loop 34 between the equalizer EQ1 and the receiver RX to assess signal quality of the second digital signal D2, such as to determine whether any residual linear distortion remains therein due to the analog cancellation signal AX1 failing to entirely cancel the reflection AY1. Calibration information may be communicated through the calibration loop 34 to facilitate the equalizer EQ1 assessing any residual distortion for purposes of adjusting subsequent digital/analog cancellation signals in compensation, i.e., the equalizer EQ1 may utilize the calibration information as part of the training process to make phase and/or delay adjustments for subsequent cancellation signals. The performance of the A-D handling signal A2 is believed to be benefited and enhanced through avoidance of having to process what the reflection AY1 and instead the second analog signal A2, which may be a weaker A2 signal from distant CM2 in comparison to the reflection AY1. EQ1 may be a FIR (finite impulse response) filter, containing taps with coefficients requiring programming.

Figure 3:
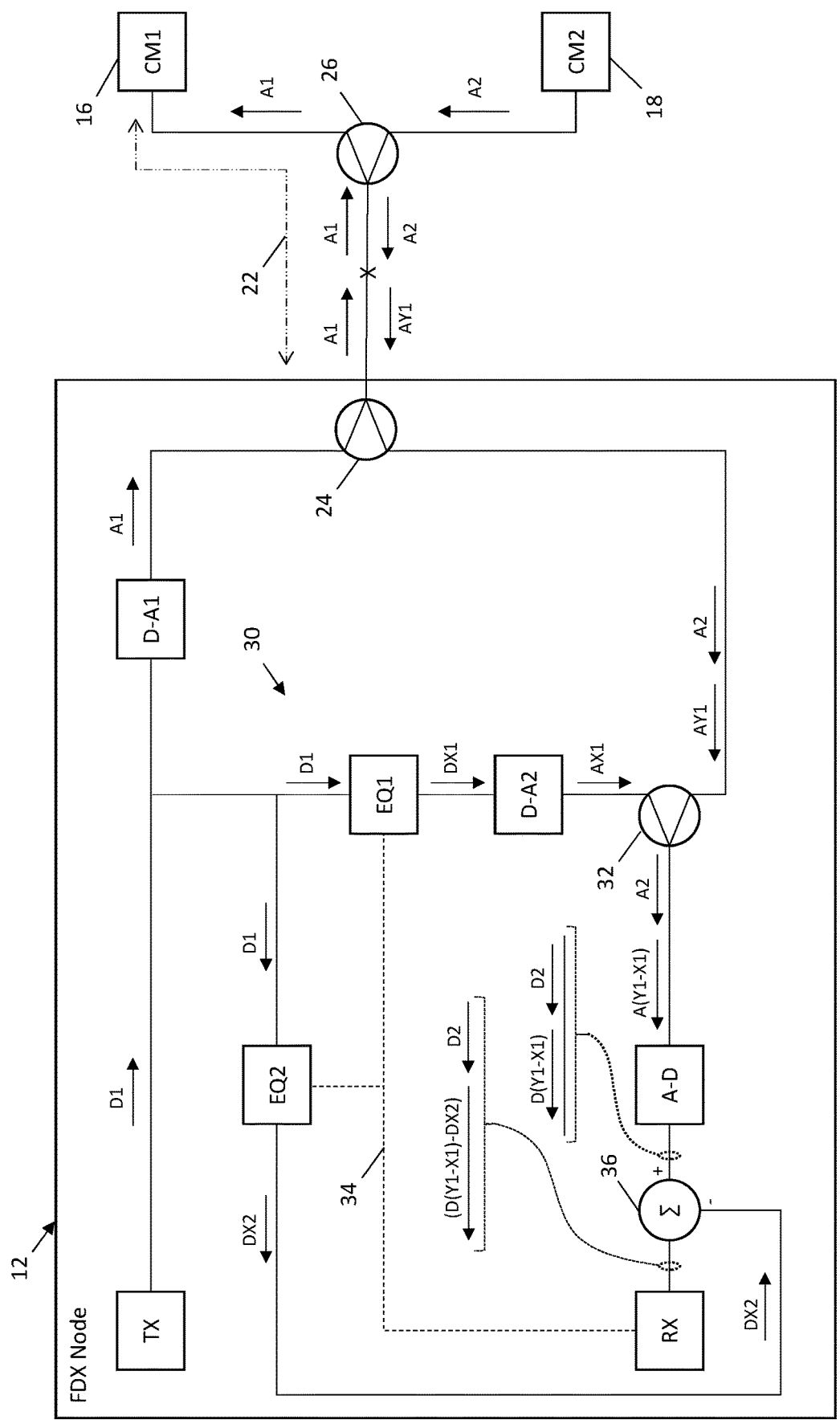
FIG. 3 illustrates a networking arrangement in accordance with one non-limiting aspect of the present invention.

FIG. 3 illustrates a networking arrangement in accordance with one non-limiting aspect of the present invention where the FDX node 12 facilitates additional echo cancellation upstream of the A-D converter A-D. The echo canceller 30 may include a second equalizer EQ2 operating in cooperation with the first equalizer EQ1 to facilitate generating a digital, residual cancellation signal DX2 for purposes of canceling residual reflection included within the second digital signal D2 following output from the A-D converter A-D. An analog representation of the residual reflection is graphically illustrated as A(Y1-X1), i.e., a result of combining the analog cancellation signal AX1 with the reflection AY1. A digital representation of the residual reflection is graphically illustrated following the A-D conversion as D(Y1-X1). The echo canceller 30 may include a digital signal processor (DSP) or the digital processing element, such as the illustrated subtractor 36, for digitally subtracting the residual cancellation with the second digital signal DX2 in the digital domain to cancel the residual reflection. The subtractor 36 is shown for exemplary purposes with respect to facilitating a summing process whereby the residual cancellation signal is summed with the second digital signal D2 output from the A-D converter. The resulting summing process is graphically illustrated as (D(Y1-X1)-DX2, which is intended to represent a digital form of any remaining residual reflection occurring after the subtractor cancellation stage, i.e., after the digital residual cancellation signal is subtracted from the digital residual reflection. The use of the subtractor 36 or other digital domain cancellation process may be beneficial in order to facilitate fine or granular signal cancellation, which may optionally cooperate with the analog domain cancellation process to provide a coarse method and a fine method for signal cancellation.

Figure 4:
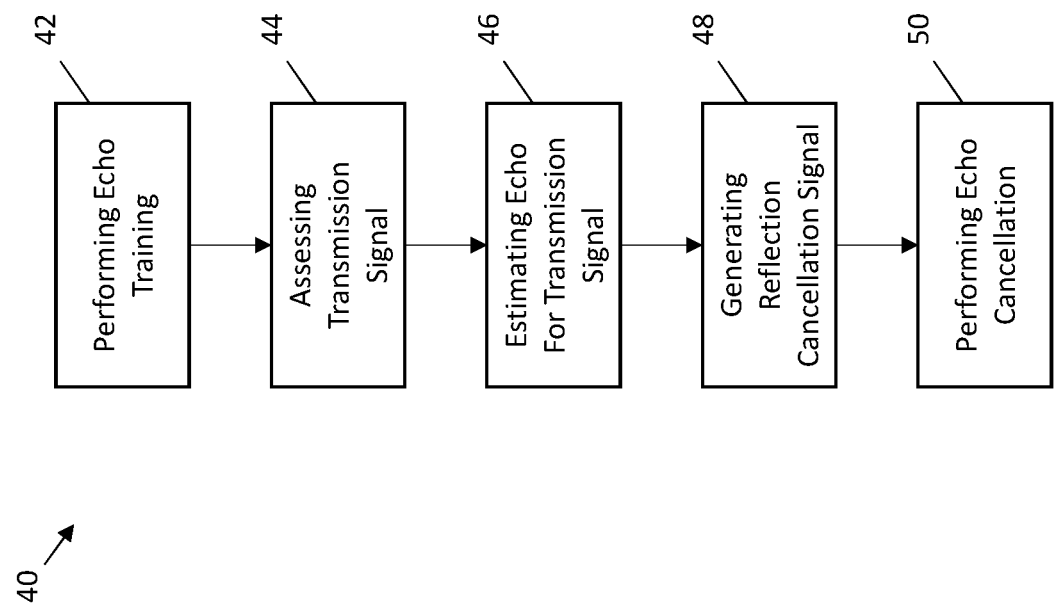
FIG. 4 illustrates a flowchart of a method for echo cancellation in accordance with one non-limiting aspect of the present invention.

FIG. 4 illustrates a flowchart 40 of a method for echo cancellation in accordance with one non-limiting aspect of the present invention. The processes, operations, instructions, logical executions and controls necessary to facilitate the contemplated echo cancellation may be facilitated with the above-referenced controller being included with or associated with the FDX node and having the non-transitory computer-readable medium with the plurality of instructions being correspondingly selected. The present invention is not necessarily intended to be so limited and fully contemplates some or all of the processes associated with the illustrative method being performed with other controllers, both inside and/or outside of the FDX node. The method is predominately described with respect to facilitating echo cancellation within a FDX communication environment due to such an environment being believed to be advantageously improved with the present invention, particularly since such an environment provides an ability to sample signals in the digital domain for purposes of generating analog signals to be used in the analog domain for cancellation as the initial digital sampling used to estimate/generate the cancellation signal may produce a more accurate representation of potential echoes than if the sampling were performed in an analog domain.

Process 42 relates to performing an echo training. The echo training may be implemented using the equalizer and/or other feature(s) of the FDX node to facilitate generating signaling characteristics associated with the FDX node individually and/or collectively communicating signals with one or more of the CMs or other devices associated with the analog communication medium, e.g., through repetitive process of transmitting pilot or test signals and ascertaining corresponding reflections, which may occur without the corresponding signaling processor received at the CMs, as well as adjusting estimates according to reflections associate with non-test signals. The echo training may optionally be utilized to facilitate mapping an architecture of the analog communication medium, such as by mapping branches forming a tree-to-branch structure for signal communication, to facilitate determining likely sources or locations where reflections may be generated and/or the shape, phase, characteristics or other nature of potential reflections. The echo training may optionally include generating a plurality of reflection datums or benchmarks for different types or characteristics of signals anticipated to be transmitted from the FDX node, such as to facilitate estimating/generating cancellation signals of differing phase and/or delay depending on the different types or characteristics of signals expected to be transmitted from the FDX node. One aspect of the echo training may be to anticipate and generate suitable cancellation signals in advance of signals actually being transmitted from the FDX node such that those pre-transmission signal cancellation datums may be adjusted following actual sampling of signaling being transmitted from the FDX node, i.e., the training process may be iteratively or repeatedly updated/performed to facilitate improving reflection estimates and adjusting reflection estimates as network conditions vary.

The reflection data is a valuable source of information for a PNM (Proactive Network Maintenance) system, which could alert technicians of changes to the reflection profile, which could be caused by physical cable damage, such as pull-outs, water in plant, radial cracks, etc. Thus historical reflection data should be reported and stored for later automatic or manual comparison.

Process 44 relates to assessing a digital signal intended to be transmitted from the FDX node. The transmission signal assessment may occur in the digital domain following output from the transmitter included at the FDX node. The transmission signal assessment may be instigated prior to or contemporaneously with transmission of the digital signal so as to facilitate instigating the contemplated echo cancellation before an analog signal inducing a reflection is communicated from the FDX node. Process 46 relates to estimating an echo anticipated to occur in response to transmission of the digital signal following subsequent D-A conversion and transmission the related analog signal from the FDX node. The echo estimation may be performed prior to the analog signal generating a reflection such that the estimated echo may represent the expected reflection without contemporaneously measuring, sensing or otherwise detecting a true reflection generated in response to actual communication of the analog signal. Process 48 relates to generating a reflection cancellation signal based on the estimated echo, which as described above may be initially generated within the digital domain and then converted to the analog domain, however, the present invention fully contemplates initially generating the reflection cancellation signal within the analog domain. Process 50 relates to performing the echo cancellation. The echo cancellation may be performed by singularly combining the reflection cancellation signal with signaling traveling upstream through the FDX node and/or in a multistage process where fine and coarse cancellations or perform, optionally with assistance of a DSP.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for echo cancellation in a full-duplex (FDX) network comprising:
 estimating an echo anticipated to occur within the FDX network for a first signal;
 generating a cancellation for the echo;
 applying in an analog domain the cancellation to a reflection of the first signal;
 storing a plurality of cancellations in a reflection library of a node, the node interfacing the first signal with a bounded medium of the FDX network, the echo being anticipated to occur within the bounded medium;

selecting the cancellation from the reflection library as a one of the plurality of cancellations having signaling characteristics related to a second signal generated in a digital domain of the node, the second signal corresponding with the first signal prior to undergoing a digital-to-analog (D-A) conversion; and applying the cancellation to the reflection within the analog domain of the FDX network.

2. The method of claim 1 further comprising estimating the echo based on a second signal within a digital domain of the FDX network.

3. A method for echo cancellation in a full-duplex (FDX) network comprising:
estimating an echo anticipated to occur within the FDX network for a first signal;
generating a cancellation for the echo;
applying in an analog domain the cancellation to a reflection of the first signal;
estimating the echo based on a second signal within a digital domain of the FDX network;
performing digital-to-analog (D-A) conversion of the second signal to the first signal at a first D-A converter included within an FDX node of the FDX network;
generating the second signal with a transmitter included within the FDX node;
generating a third signal with an equalizer included within the FDX node, the equalizer processing the second signal to generate the third signal; and
performing D-A conversion of the third signal to a fourth signal with a second D-A converter included within the FDX node, the fourth signal being the cancellation applied to the reflection.

4. The method of claim 3 further comprising:
implementing a training process with the equalizer to determine reflection probability for communication of the first signal from the FDX node to an FDX cable modem (CM) connected downstream thereof, the training processing including transmission of a sounding signal from the FDX node to the FDX CM; and
generating the third signal as function of a comparison generated by the equalizer comparing the sounding signal to the second signal.

5. The method of claim 4 further comprising selecting at least one of a phase and a delay for the third signal based on the comparison such that the least one of the phase and the delay opposes at least a corresponding one of phase and delay of the reflection.

6. The method of claim 4 further comprising performing the echo cancellation by applying the fourth signal to the reflection using a first splitter included within the FDX node.

7. The method of claim 6 further comprising estimating the echo based on a source of the echo being located between a second splitter and the FDX CM, the second splitter included within the FDX node downstream of the first splitter.

8. The method of claim 7 estimating the source of the echo to be located upstream of a third splitter connected between the second splitter and the FDX CM.

9. The method of claim 7 further comprising facilitating transport of the reflection from the second splitter to the first splitter without amplification.

10. The method of claim 7 further comprising performing analog-to-digital (A-D) conversion of a fifth signal to a sixth signal with an A-D converter included within the FDX node, the fifth signal being output from the first splitter following application of the fourth signal to the reflection.

11. The method of claim 10 further comprising facilitating transport of the sixth signal to a receiver included within the FDX node.

12. The method of claim 10 further comprising:
performing digital signal processing of the sixth signal to a seventh signal with a digital signal processor (DSP) included within the FDX node; and
facilitating transport of the seventh signal to a receiver included within the FDX node.

13. The method of claim 3 further comprising facilitating transport of the first signal from the first D-A converter to a device without amplification along a bounded-signaling path defined therebetween, the reflection occurring within the bounded-signaling path downstream of the FDX node and upstream of the device.

14. A full-duplex (FDX) system having echo cancellation comprising:
a digital network communicating signaling within a digital domain;
an analog network communicating signaling in an analog domain;
a node for interfacing signaling between the digital domain and the analog domain, the node including an echo canceller for canceling a reflection received at the node in response to an analog signal previously transmitted therefrom, the echo canceller combining an analog cancellation signal with the reflection to facilitate the echo cancellation;
wherein the node includes:
i) a transmitter transmitting a first digital signal;
ii) a first digital-to-analog (D-A) converter converting the first digital signal to the analog signal;
iii) a receiver processing a second digital signal output from the echo canceller; and
wherein the echo canceller includes:
i) an equalizer generating a third digital signal based on an echo expected in response to transmission of the analog signal from the node;
ii) a second D-A converter converting the third digital signal to the analog cancellation signal;
iii) a combiner combining the analog cancellation signal with the reflection; and
iv) an analog-to-digital (A-D) converter converting an output from the combiner, the output subsequently becoming the second digital signal.

15. The FDX system of claim 14 wherein the echo canceller includes a digital signal processor (DSP) processing the output of the A-D converter to create the second digital signal, the DSP finely canceling in the digital domain at least a portion of the output from the A-D converter associated with the reflection remaining in the analog domain after the combiner.

16. A full-duplex (FDX) node comprising:
a transmitter transmitting a first digital signal;
a first digital-to-analog (D-A) converter converting the first digital signal to a first analog signal;
a splitter outputting the first analog signal to an analog network for transmission to a recipient;
an equalizer generating a second digital signal based on an echo expected in response to transmission of the first analog signal from the node;
a second D-A converter converting the second digital signal to an analog cancellation signal;
a combiner outputting a second analog signal derived from combining the analog cancellation signal with a reflection received at the splitter following transmission of the analog signal therefrom;

an analog-to-digital (A-D) converter converting the second analog signal to a third digital signal; and
a receiver processing the third digital signal.

17. A method for echo cancellation in a full-duplex (FDX) network comprising:
estimating an echo anticipated to occur within the FDX network for a first signal;
generating a cancellation for the echo;
applying in an analog domain the cancellation to a reflection of the first signal;
estimating the echo and generating the cancellation with an FDX node connected to the FDX network;
estimating the echo to account for a source of the echo being located within the FDX network downstream of the FDX node and upstream of an FDX device communicating over the FDX network; and
performing analog-to-digital (A-D) conversion of a fifth signal to a sixth signal with an A-D converter included within the FDX node, the fifth signal being a result of a splitter of the FDX node applying the cancellation to the reflection.

18. The method of claim 1 further comprising estimating the echo and applying the cancellation to the reflection with an echo canceller operating the node, including estimating the echo such that the echo accounts for the reflection occurring at a location downstream of the node.

* * * * *